United States Patent [19]

Sangiamo et al.

[11] Patent Number: 4,527,224
[45] Date of Patent: Jul. 2, 1985

[54] MOUNTING FOR HIGH INTENSITY LIGHT FIXTURE

[75] Inventors: Richard Sangiamo, Roselle; Thomas Russello, Elizabeth, both of N.J.

[73] Assignee: Keene Corporation, Union, N.J.

[21] Appl. No.: 624,059

[22] Filed: Jun. 25, 1984

[51] Int. Cl.³ .................. F21V 17/02; F21V 19/02
[52] U.S. Cl. .................... 362/282; 362/269; 362/287; 362/322; 362/371
[58] Field of Search ........... 362/269, 282, 287, 322, 362/371, 427, 449

[56] References Cited

U.S. PATENT DOCUMENTS

| | | | |
|---|---|---|---|
| 1,505,654 | 8/1924 | Macbeth | 362/282 |
| 1,709,855 | 4/1929 | Keating | 362/322 |
| 3,246,135 | 4/1966 | Husby | 362/269 |
| 3,254,205 | 5/1966 | Cobb | 362/269 |
| 3,476,925 | 11/1969 | Adra | 362/269 |
| 4,323,953 | 4/1982 | Hutchinson | 362/269 |

Primary Examiner—Andrew M. Dolinar

[57] ABSTRACT

A high intensity flood light fixture is provided consisting of a ballast housing and a reflector housing which are rotatably mounted with respect to each other. Indexing means are provided about the joint between the housings and also about an opening in the ballast housing adapted to receive a mounting tenon. A unique strain relief is provided for the power cord to the fixture which also serves as a water tight seal for the power cord.

8 Claims, 5 Drawing Figures

MOUNTING FOR HIGH INTENSITY LIGHT FIXTURE

BACKGROUND OF THE INVENTION

The present invention relates to high intensity flood lighting fixtures and in particular to an improved mounting arrangement for such fixtures.

High intensity lighting fixtures are extensively used for providing general and security illumination in a wide variety of applications. Such fixtures are commonly used for stadium lighting, in parking fields, around the perimeters of buildings and the like. The fixtures may be mounted to the top of a stanchion or pole, or, the fixture may be mounted to a bracket which, in turn, may be mounted to a stanchion, pole, or to a wall.

In mounting such fixtures it is important that the fixture lamp be properly oriented with respect to both the horizontal and vertical to insure that the emitted light will fall in the required pattern on the location where illumination is required. Heretofore the aiming of such fixtures has been one of the most difficult and time consuming portions of the installation procedure usually requiring two installers, one to hold and attempt to mount the fixture while the other aims the fixture and checks the distributed light pattern. In addition, once mounted the orientation of the fixture cannot be readily altered without repeating the aiming process. Thus, the mounting and orienting of high intensity light fixtures has been a costly and timing consuming portion of the fixture installation process. This is particularly so where the installation specifications or the architectural plans call for a specific light pattern or fixture orientation.

In view of the above, it is the principle object of the present invention to provide an improved flood lighting fixture arrangement which permits virtually unlimited and precise aiming possibilities.

A further object is to provide such a fixture arrangement wherein the labor involved in installation is minimized.

A still further object is to provide such a fixture wherein adjustments may readily be made after the installation has been completed and wherein the labor involved in such adjustments is minimized.

SUMMARY OF THE INVENTION

The above and other beneficial objects and advantages are attained in accordance with the present invention by providing an improved high intensity flood lighting fixture comprising a ballast housing and a reflector housing. The ballast housing includes a top wall from which a lamp socket extends and an upwardly extending ridge surrounds the socket. The reflector housing seats on the ballast housing and includes a bottom wall with an opening therein sufficiently large to pass the socket as well as a downwardly extending ridge surrounding the opening. When the reflector housing is seated on the ballast housing the ridges cooperate in forming a water-tight joint therebetween while permitting one of the housings to rotate with respect to the other housing. Index means are provided on one of the housings adjacent to its joint ridge. The other of the housings is provided with sighting means whereby the front face of the reflector housing may be precisely positioned with respect to the ballast housing.

The ballast housing is further provided in a sidewall thereof with a tenon receiving opening about which an index is precisely disposed. This permits the ballast housing to be precisely oriented about the tenon or a bracket to which the tenon is mounted. The first indexing means provides for precise orientation of the fixture about its vertical axis. The second indexing means provides for precise orientation of the fixture about a horizontal axis.

DETAILED DESCRIPTION OF THE PREFERRED EMBODIMENT

Figure 1:
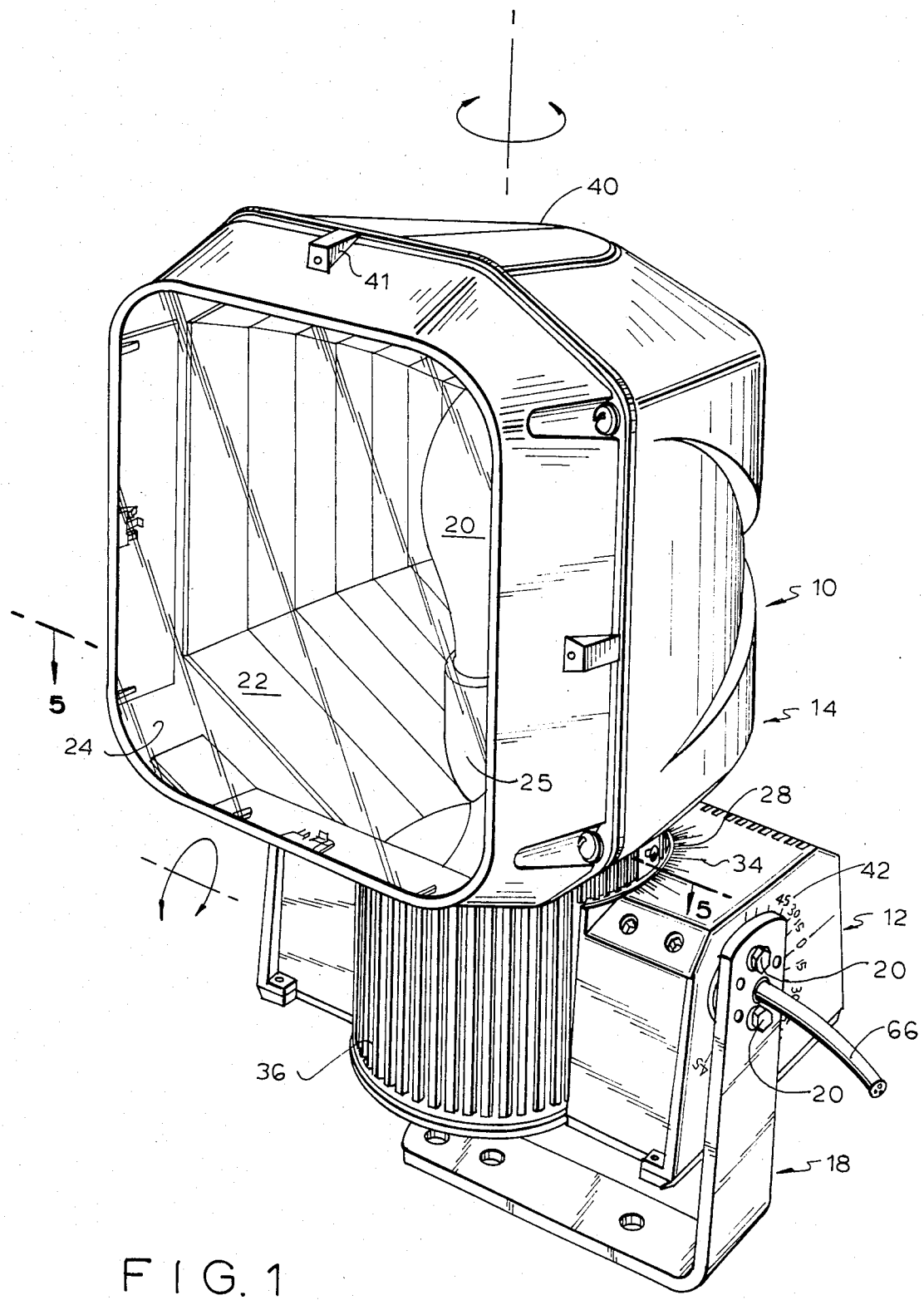
FIG. 1 is a perspective view of a high intensity light fixture in accordance with the present invention.
Figure 2:
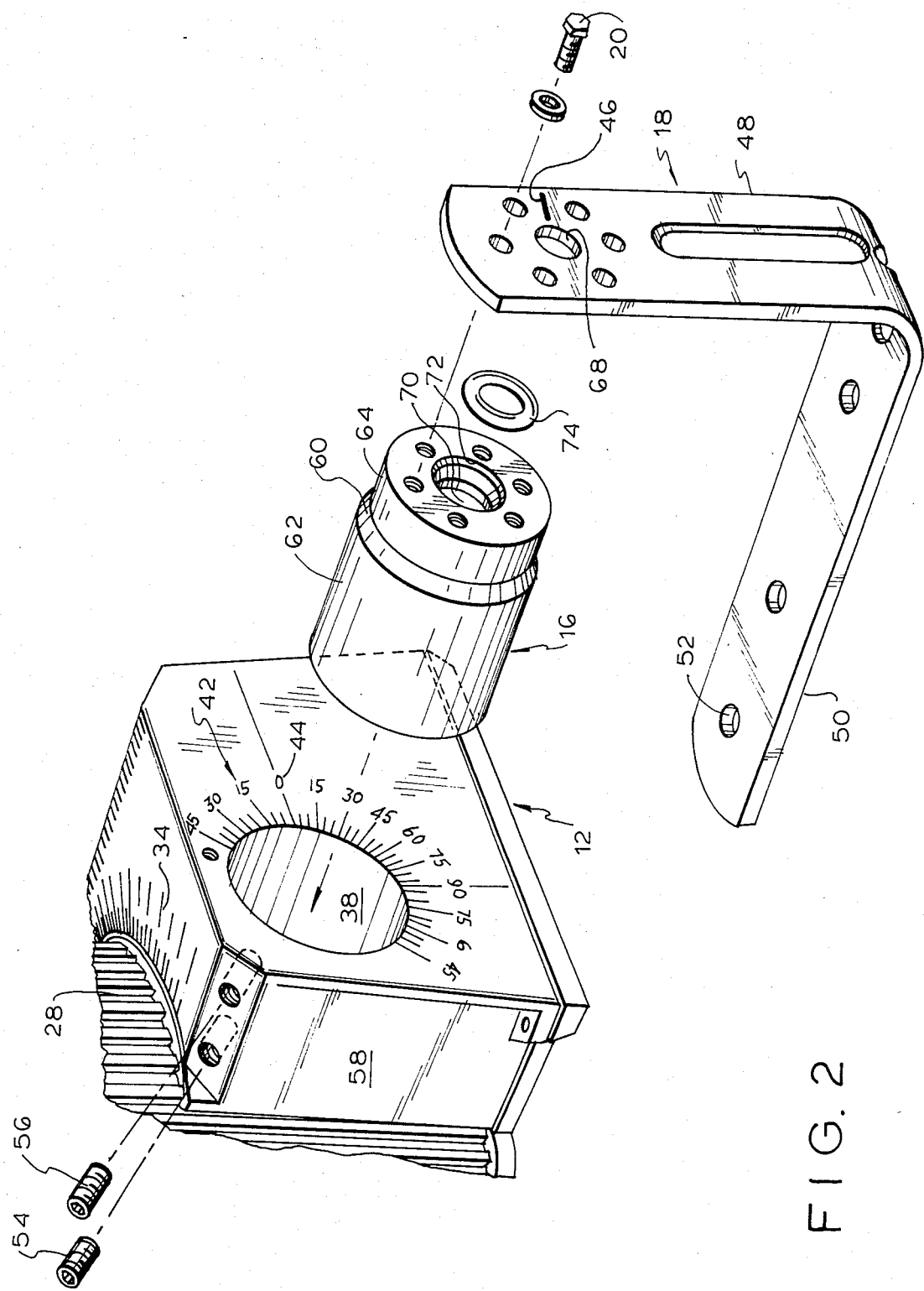
FIG. 2 is a fragmentary, exploded perspective view of portions of the fixture ballast housing and an associated mounting bracket and tenon.
Figure 3:
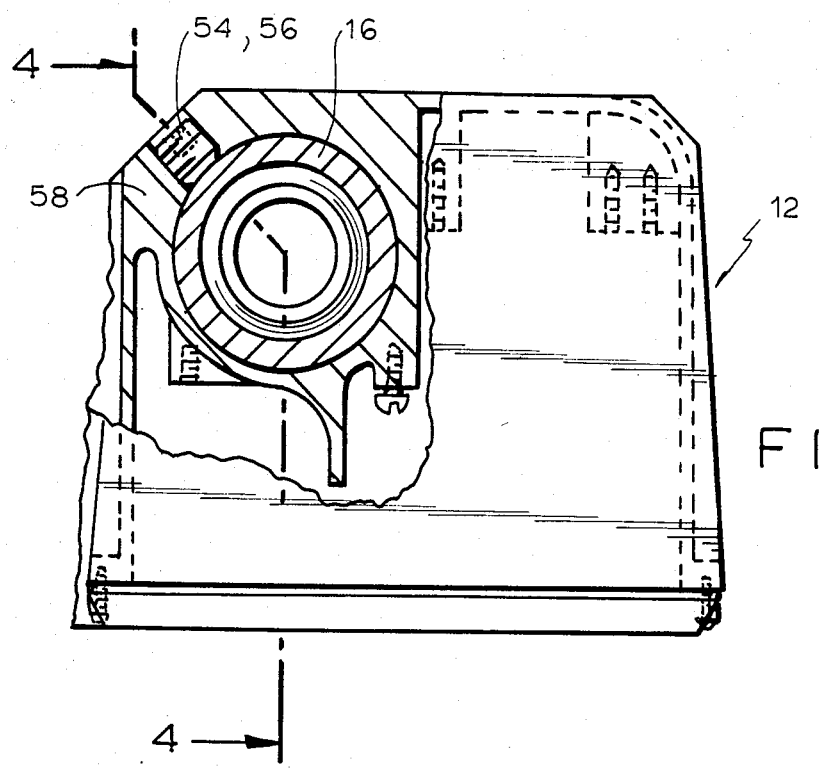
FIG. 3 is a cutaway, fragmentary, side elevational view of the fixture ballast housing.
Figure 4:
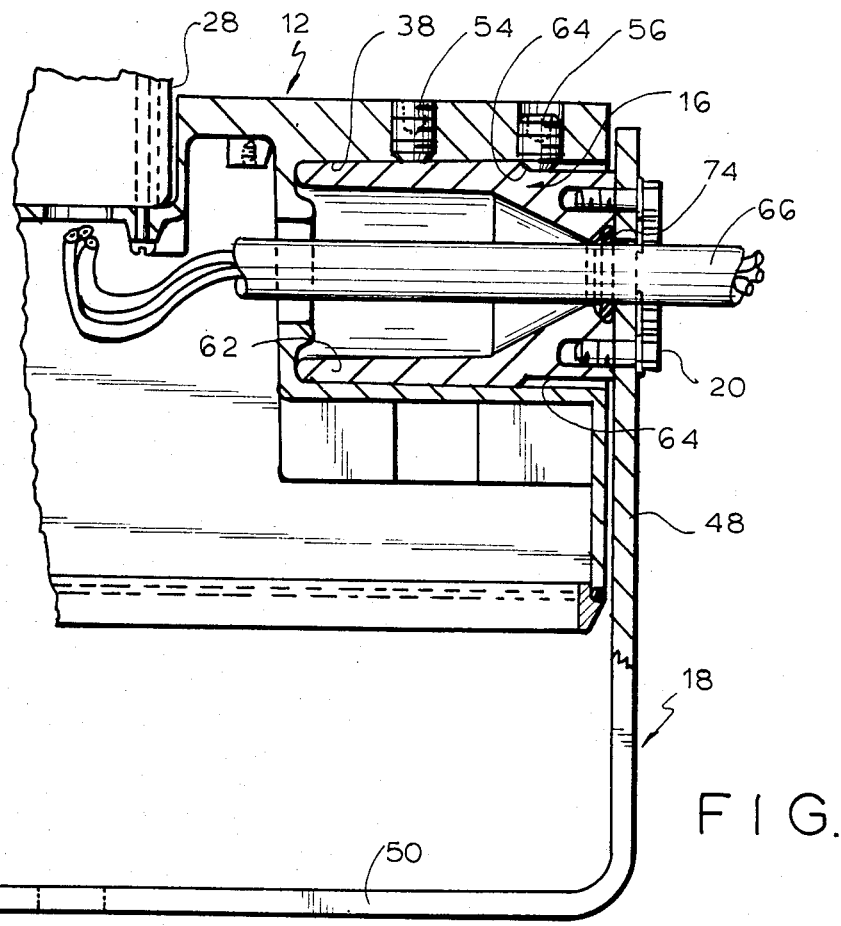
FIG. 4 is a sectional view taken along reference lines 4—4 of FIG. 3.

Reference is now made to the drawings and to FIG. 1 in particular wherein a high intensity flood lighting fixture 10 is shown comprising a ballast housing 12 and a reflector housing 14. The housings 12 and 14 are preferably formed of a light, heat disipating material such as die cast aluminum. The ballast housing 12 is mounted to a standard 2" tenon (see FIG. 2) which in turn is secured to a mounting bracket 18 by bolts 20 which pass through the bracket to engage threaded openings in the end of tenon 16. A lamp 20 is provided in the reflector housing suitably positioned with respect to a series of reflector panels 22 to direct its light through the transparent front wall 24 of the reflector housing. The lamp may be of the high pressure sodium, metal halide, or mercury type as determined by the particular application for the fixture.

Lamp 20 is seated in a socket 26 which extends from the top of the ballast housing through an opening in the bottom of the reflector housing.

Figure 5:
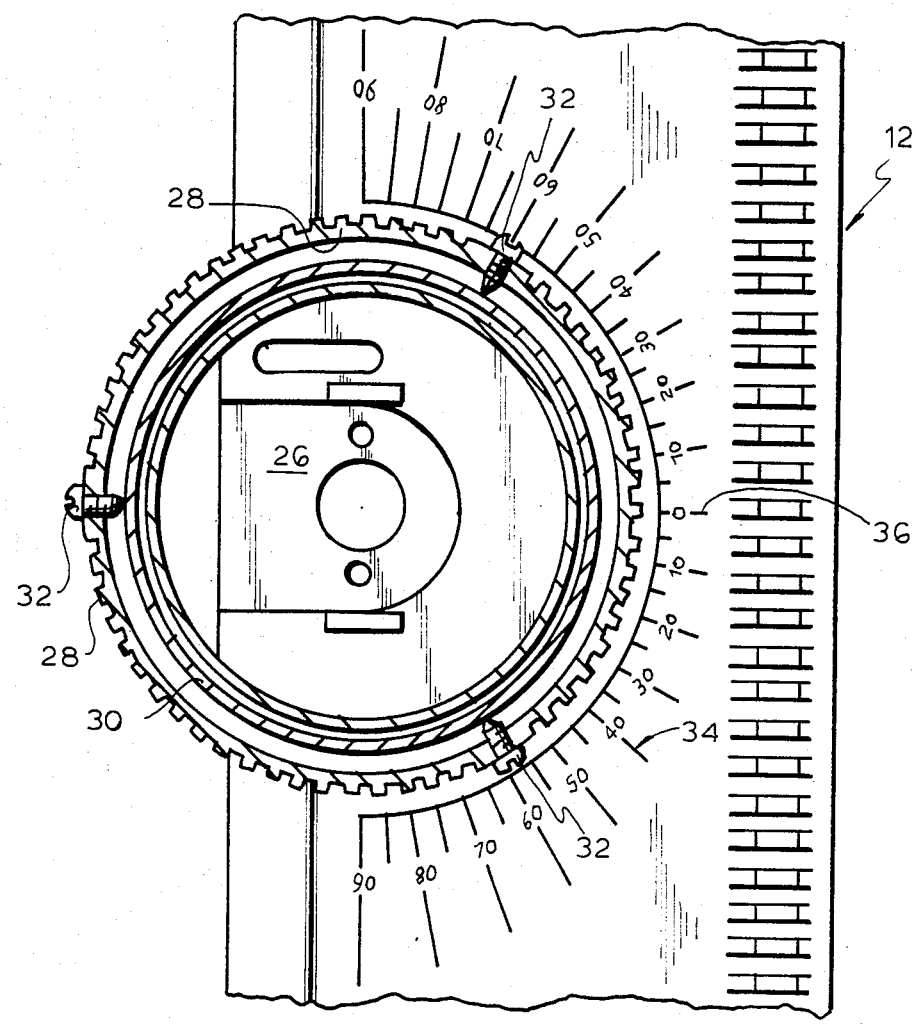
FIG. 5 is a fragmentary sectional view taken along reference lines 5—5 of FIG. 1.

As can be seen in FIG. 1, a circular collar 28 extends from the top of the ballast housing. Referring now to FIG. 5 it can be seen that a concentric neck or collar 30 of the reflector housing 14 fits within the collar 28 of the ballast housing. This arrangement permits the reflector housing to be rotated with respect to the ballast housing. Set screws 32 which pass through the ballast housing collar to engage the reflector housing collar 30 limit rotation of the housings when set. It is important to note that while lamp 20 is positioned within the reflector housing 14 it is, in fact, mounted to the ballast housing via socket 26. Thus, rotation of the one housing with respect to the other housing is not interferred with by the wiring to the lamp. A series of index markings 34 are provided on the top of the ballast housing surrounding collar 28. The index markings are set at 5° quadrants. As shown in FIG. 5 the quadrants extend both clockwise and counter-clockwise from the 0° mark which is exactly opposite to the center of the front face 36 of collar 28 which, in turn, is exactly perpendicular to the axis of the opening 38 for tenon 16. In a similar fashion, the center of the reflector housing 14 is defined by a line 40 which extends across the top and down the back of the reflector housing. Line 40 terminates in a sight 41 which may be used to "aim" the reflector housing at a target. Thus, by aligning line 40 with the proper quadrant marking of index 34 the transparent front face 24 of the reflector housing be positioned at any desired angle with respect to the axis of tenon 16. Conversely, by aiming the reflector housing at a target and then noting the aligned quadrant marking the resultant orientation may readily be repeated.

In a similar fashion, index markings are provided in 5° quadrants adjacent the tenon opening 38. A 0° mark 44 is provided at the extension of a diameter passing through the opening 38 which is exactly perpendicular to the axis of collar 28. A line 46 is provided on the vertical portion 48 of bracket 18. The horizontal portion 50 of the bracket 18 is provided with mounting holes 52 which permit the bracket to be secured to a building wall or the like. Thus, by aligning line 46 with a desired quadrant marking the ballast housing may be offset as desired with respect to the mounting portion 50 of bracket 18 and hence with the surface to which the fixture is to be mounted. In this regard, a pair of set screws 54, 56 which pass through the front face 58 of the ballast housing to engage the tenon and prevent rotation of the ballast housing with respect to the tenon when set.

To facilitate mounting, the tenon 16 is provided with a shoulder 60 with the larger diameter 62 in front of the smaller diameter 64.

During installation the tenon 16 is first positioned in opening 38 and the rear set screw 56 is tightened a sufficient amount to prevent the shoulder 60 from passing while still permitting the tenon to be rotated so that line 46 may be aligned with the proper index quadrant. The two set screws 54 and 56 are then set so as to prevent further rotation. This permits a very easy and accurate alignment of the fixture with regard to the mounting surface. It should be apparent that if the vertical and horizontal aiming angles are known in advance the unit can be properly aligned on the ground prior to any installation.

The power for the fixture is brought to the socket by power cord 66 which passes through an opening 68 in bracket 18 as well as a central opening through tenon 70. A unique feature of the present fixture resides in the manner in which strain is relieved from the power cord and the interior of the fixture is sealed. To this end, a chamfer 72 is provided about the opening in the tenon and an O-ring is provided which seats snugly in the chamfer. When bracket 18 is bolted to the end of the tenon the O-ring 74 is compressed to seal the opening into the tenon. By selecting the inside diameter of O-ring 74 so that it is substantially equal to the outside diameter of the power cord 66 compression of the O-ring also results in its gripping the outer surface of the power cord and thereby locking the power cord in position when it is captured in position between the end of tenon 16 and bracket 18. In order to insure that the tenon is positioned properly with respect to the ballast housing shoulder 60 is provided with a chamfer which corresponds to the chamfer at the front of set screw 56. As a result, as set screw 56 is tightened tenon 16 is drawn into proper position.

Thus, in accordance with the above, the aforementioned objectives are effectively attained.

Having thus described the invention, what is claimed is:

1. An improved high intensity light fixture comprising:

a ballast housing having a top wall, a lamp socket extending upwardly from said top wall, and an upwardly extending collar surrounding said socket;
   a reflector housing positioned on said ballast housing for rotation and having a front face, a bottom wall, an opening in said bottom wall sufficient to pass said socket and a downwardly extending collar surrounding said opening;
   said ballast housing collar and said reflector housing collar being concentric with each other and defining a joint therebetween which permits one of said housings to be rotated with respect to the other of said housings;
   indexing means on one of said housings adjacent said joint; and,
   aligning means on the other of said housings whereby the front face of said reflector housing may be precisely oriented with respect to said ballast housing.

2. The invention in accordance with claim 1 wherein said aligning means is positioned on the reflector housing and said indexing means is positioned on said ballast housing.

3. The invention in accordance with claim 1 further comprising:

a side wall of said ballast housing;
   a cavity extending into said ballast housing from an opening in said side wall for receiving the end of a tenon;
   a tenon positioned in said cavity at one end and secured to a bracket at the opposite end;
   a bracket secured to said tenon; and,
   second indexing means disposed either adjacent said side wall opening or said bracket and second aligning means disposed on the other of said bracket or adjacent said side wall opening whereby the plane of said front face may be precisely oriented with respect to the axis of said tenon.

4. The invention in accordance with claim 3 wherein said second indexing means is disposed adjacent said side wall opening and said second aligning means is disposed on said bracket.

5. The invention in accordance with claim 3 wherein said tenon has a first, larger diameter extending from said one end;

a second, smaller diameter spaced from said one end;
   a tapered step forming a transition between said larger and smaller diameters; and,
   a set screw passing though said ballast housing to engage said second diameter.

6. The invention in accordance with claim 5 further comprising second set screw means passing through said ballast housing to engage with said larger tenon diameter.

7. The invention in accordance with claim 5 wherein said set screw has a lead portion which tapers at an angle corresponding to the angle of said tapered step whereby when said set screw is urged into said ballast housing the lead section of said set screw and tapered shoulder cooperate in positioning said tenon within said cavity.

8. The invention in accordance with claim 3 further comprising a cable bore passing through said bracket and said tenon to said socket;

a tapered opening in said tenon opposite end communicating with said bore; and,
   an O-ring positioned about said cable and within said tenon tapered opening whereby when said bracket is positioned against said tenon opposite end said O-ring is deformed to grasp said cable to provide strain relief for said cable while sealing said cable bore.

* * * * *